United States Patent [19]

Wilkerson

[11] Patent Number: 5,440,219
[45] Date of Patent: Aug. 8, 1995

[54] INDUCTION MOTOR SPEED CONTROL HAVING IMPROVED SENSING OF MOTOR OPERATIVE CONDITIONS

[76] Inventor: Alan W. Wilkerson, c/o The Gemini Company, W61 N14280 Taunton Ave., P.O. Box 191, Cedarburg, Wis. 53012

[21] Appl. No.: 65,604

[22] Filed: May 21, 1993

[51] Int. Cl.$^6$ .............................................. H02P 1/42
[52] U.S. Cl. ..................................... 318/802; 318/807; 318/799; 318/459
[58] Field of Search ................. 318/807, 799, 721–723, 318/805, 809, 138, 254, 801, 802, 803, 798, 459

[56] References Cited

U.S. PATENT DOCUMENTS

| | | | |
|---|---|---|---|
| 4,409,533 | 10/1983 | Kawabata | 318/807 |
| 4,712,050 | 12/1987 | Nagasawa et al. | 318/254 |
| 4,916,368 | 4/1990 | Onoda et al. | 318/723 |
| 4,959,596 | 9/1990 | MacMinn et al. | 318/138 |
| 5,175,483 | 12/1992 | Fujii et al. | 318/807 |

*Primary Examiner*—John W. Cabeca
*Attorney, Agent, or Firm*—Andrus, Sceales, Starke & Sawall

[57] ABSTRACT

An apparatus and method controls the speed of an AC induction motor by varying the frequency and current to the motor from an inverter power supply. A Counter EMF regulator receives a reference signal corresponding to the desired speed, and a signal proportional to CEMF for feedback. The output of the CEMF regulator is provided to the power supply to control the current to the motor. The CEMF feedback signal is also utilized to vary the output frequency of the power supply in accordance with the magnitude of the CEMF. This maintains the magnetizing component of stator winding current at a constant value for all operating frequencies of the motor. A signal corresponding to the load current component of the stator winding adds to the speed reference signal to the CEMF regulator to increase CEMF and frequency with increasing load, thereby to compensate for increased slip and maintain constant speed. The phase displacement between CEMF and stator winding current is determined. If the phase displacement is less than 90°, the motor is in the motoring condition and the frequency of the power supply is determined solely by the CEMF. If the phase displacement is greater than 90°, the motor is regenerating, and the frequency of the power supply is increased to prevent regeneration, and to avoid the need for the power supply to absorb regenerative energy.

36 Claims, 5 Drawing Sheets

INDUCTION MOTOR SPEED CONTROL HAVING IMPROVED SENSING OF MOTOR OPERATIVE CONDITIONS

The present invention relates to a control for an AC induction motor that provides improved speed and avoids regenerative operation of the motor.

BACKGROUND OF THE INVENTION

In many applications where a load is driven by an electric motor, it is desirable to vary the speed of the motor to provide optimum performance of the driven load.

DC motors have long been widely used for this purpose, since the speed of a DC motor can be easily controlled by changing the voltage applied to its terminals. A good measure of the DC motor speed is the armature voltage, and this voltage is used in many control systems for feedback purposes to regulate the motor speed. Similarly, armature current is a good indication of load torque.

However, a DC motor is expensive because of the complex windings on its armature, and because a commutator is required. In addition, a DC motor has brushes to conduct current to the armature. These brushes have a limited life, making periodic maintenance necessary.

A "squirrel cage" AC induction motor, on the other hand, is relatively inexpensive, since the windings consist of metal bars which are cast into steel laminations that make up the remainder of the rotor and the stator windings can easily be inserted in slots in stator laminations. An induction motor, at least in a polyphase variety, has no brushes, no moving parts other than the rotor, and virtually no maintenance.

While the speed of an induction motor can be varied to a certain extent by varying the voltage applied to the stator winding, and holding the applied frequency constant, only a limited speed range is available. And the electrical losses in the motor can be excessive, if the load is too great, with a serious potential for burning out the motor.

It is, however, possible to efficiently control the speed of an induction motor by varying the frequency as well as the magnitude of the AC voltage applied to the motor.

Solid state inverters are often used for this purpose. The inverter generates variable frequency multi-phase AC voltages to feed the induction motor stator windings and varies the magnitude of these voltages to be essentially proportional to the frequency. The waveform of the applied voltage may be a square wave; a multi-stepped rectangular waveform that approximates a sine wave; or a true sine wave, commonly generated by pulse-width modulation. For any of these waveforms, AC power in AC power mains is rectified to provide a DC voltage on a DC bus, and solid state switches, connected between the bus and the motor windings, operate sequentially to provide the AC voltages to the motor stator windings.

When operating at no load, the induction motor rotor operates at a speed that is essentially proportional to the applied frequency, known as the "synchronous speed", since it is the same speed that a synchronous AC motor will run at the same applied frequency. When a load is applied to an AC induction motor, the rotor speed changes in an amount known as "slip", with the rotor speed being slower than synchronous speed for loads that absorb power, and higher than synchronous speed for loads that attempt to drive the motor at a speed greater than unloaded speed. The difference between synchronous speed and rotor speed is "slip speed".

When the rotor speed is greater than synchronous speed, the induction motor becomes a generator and returns power to the source, which in this case is the DC bus, derived from the AC mains. If no mechanism is available for the DC bus to absorb this "regenerative" energy, the bus voltage rises, potentially to a destructive level.

Regeneration may result from as simple an action as turning the speed control of an inverter to a lower level or attempting to connect a coasting motor to an inverter set to a lower frequency. In the prior art, many methods have been devised to absorb any regenerative energy that may appear, or to shut down the inverter if regeneration is attempted.

Whatever means is used to absorb regenerative energy, it adds significantly to the cost of the inverter, since instantaneous power may be quite substantial. If the inverter is programmed to disable itself by "tripping" or shutting down on regeneration, there may be many nuisance shut downs. When the application does not require regeneration, it is therefore desirable for an inverter to be able to detect when regeneration is imminent and to prevent it at a signal level where the cost is negligible, and without shut down or other disruption.

One object of this present invention therefore is to provide an AC induction motor control that senses when the rotor is running faster than desired, and prevents regeneration, thereby saving the circuitry cost and complexity required to absorb this regenerative energy, and avoiding the inconvenience of resetting an inverter that has tripped out because regeneration has occurred.

In prior art, the speed of the induction motor has been controlled by applying variable frequency voltages, the frequency of which approximates the desired speed and the magnitude of which is proportional to the frequency. At very low speeds, the voltage is usually "boosted" to account for the impedance change of the motor at very low frequencies. At any given speed setting, the frequency remains constant, and therefore the rotor speed will vary with changing loads according to the slip of the rotor.

However, if at any given setting, the load on the motor becomes excessive, the slip will increase substantially beyond the rated level, and the motor current will become correspondingly excessive or even destructive. For this reason, most prior art inverters are designed to "trip" out during overload conditions, requiring resetting and restarting. In most cases, the motor must coast to a stop before restarting.

Unlike the DC motor, the operating speed of the AC induction motor is not easily discernible by observing voltages and currents. For example, the voltages and currents of the induction motor are AC signals, and as such, if used directly, require rectification and filtering to determine the absolute values for feedback purposes. At lower speeds, however, with frequencies of only a few Hertz, the filtering required to obtain a DC signal has such a long time constant as to render any control action very sluggish.

And, while the torque of a DC motor is almost exactly proportional to the armature current, this is not true in an induction motor, where the relationship between torque and input current is very non linear. Some AC induction motors require almost as much current at no load as they do at full load.

In prior art, speed measuring devices, such as tachometer generators, have been used to improve speed regulation by providing speed feedback signal to the motor control, and the input frequency is adjusted accordingly to compensate for the slip. Various methods, known generally as "vector control", are used to adjust the input voltage or current to a level appropriate for the existing slip.

The use of speed measuring devices, while effective, requires access to the motor shaft, and additional connections between the motor and the control, both of which add to the cost of a system. When it is desired to add speed control to an existing motor installation, it may not be practical or even possible to add the speed measuring device.

It is, therefore, a second object of the present invention to employ electronic measurement and signal conditioning to interpret the information available at the terminals of an AC induction motor to determine motor load and speed conditions without excessive filtering, and to use this information as feedback in a closed loop speed control for a power supply, such as an inverter.

More specifically, it is an object of this invention to use the voltage and current of the induction motor stator windings, with improved signal conditioning, to determine speed and load and, using this information as feedback in the motor control, to accurately regulate the speed of the motor under varying conditions of load.

A third object of the invention is to use the load information so obtained to provide safe operation during overload conditions in the motor by reducing speed, and to allow starting a motor that is rotating prior to the time it is started without creating excessive currents or torques.

SUMMARY OF THE INVENTION

The apparatus and method of the present invention regulates speed of an AC induction motor by providing current command and frequency command signals to an AC power supply, such as an inverter, for an AC motor. The command signals control the magnitude and frequency, respectively, of the current supplied to the stator winding of the motor.

A signal proportional to the Counter EMF of the motor is obtained. This CEMF signal is employed as a frequency command signal to the inverter so that the frequency of the stator winding current is proportional to the CEMF of the motor. This maintains the magnitude of the magnetizing current component of the stator winding current at the same value for all operating frequencies of the motor.

A CEMF regulator receives a CEMF reference signal which approximates the desired speed. The CEMF signal from the motor is employed as the feedback signal to the regulator and the output of the regulator comprises the current command signal to the inverter.

The load current component of the stator winding current is determined. For small values of slip, the load current is proportional to slip, and can be used as a measure of slip.

The CEMF reference signal is boosted by a signal proportional to the load current component of the stator winding current. The boosted CEMF reference signal, acting through the CEMF regulator, causes the CEMF of the motor to increase. This, in turn, increases the frequency command and the frequency of the stator winding current. The frequency of the power supplied to the motor is increased by an amount which compensates for the slip of the motor so that the speed of the rotor remains at the desired level. The CEMF reference signal thus serves as a speed controlling signal for the motor.

The magnitude of the output current of the AC supply is limited. If the load increases beyond the limited magnitude, the CEMF and the frequency both decrease, reducing the speed while maintaining rated magnetizing current, to a level at which the load is no longer potentially damaging to the stator or the rotor.

Regenerative operation of the motor is avoided as follows. The phase displacement between the CEMF and the stator winding current is determined. If the phase displacement is less than 90 electrical degrees, the motor is in the motoring condition and the frequency of the power supplied the inverter is determined solely by the CEMF signal, as described above. If the phase displacement is greater than 90 electrical degrees, the motor is regenerating. In this condition, the frequency of the stator winding current is increased by an amount sufficient to prevent regenerative operation of the motor.

The phase relationship between the CEMF and the stator winding described above is also used to establish the initial frequency of the inverter when starting an AC motor that was rotating prior to startup, without causing excessive current or torque.

BRIEF DESCRIPTION OF THE DRAWING

The present invention will be further understood by reference to the following detailed description and accompanying drawings in which.

DETAILED DESCRIPTION OF THE PREFERRED EMBODIMENTS

Figure 1A:
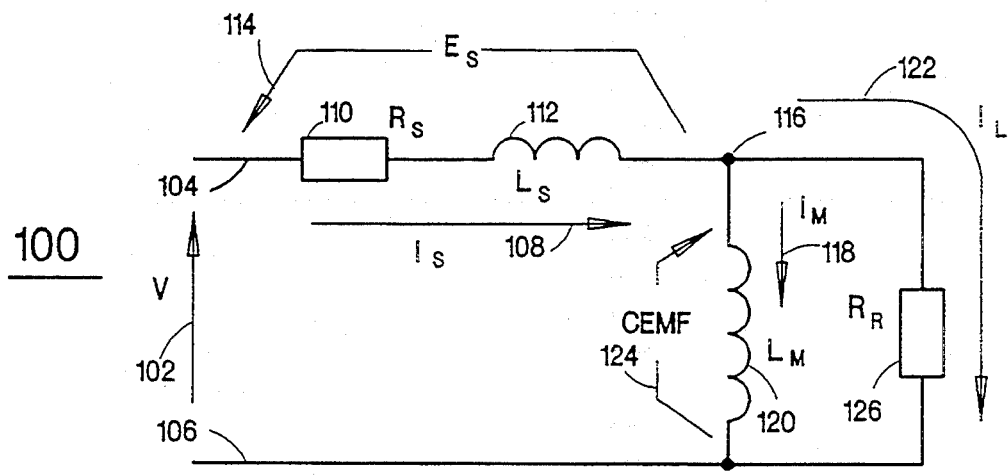
FIG. 1A is a simplified equivalent circuit of an AC induction motor.

An AC induction motor consists of two parts. The first part is stationary. It is thus known as the "stator" and contains electrical windings for establishing a magnetic field in the motor, mounting feet or a flange for holding the motor in place, and bearings for supporting the shaft of the second part of the motor, known as the "rotor", which rotates and transmits power to or from the motor load.

The stator is a hollow cylindrically shaped magnetic steel structure. The solid cylindrically shaped rotor is placed in the stator's hollow center, with an air gap between the outer surface of the rotor and the inner surface of the stator. A multitude of stator windings are arranged in slots around the inside periphery of the stator and grouped into poles. Electrical excitation of a stator winding causes that winding to establish a magnetic field in the air gap between the stator and the rotor.

The multiple windings of the stator are arranged so that when they are energized by a multiphase AC voltage or current, the windings are sequentially energized with magnitudes of voltage or current that result in a magnetic field in the air gap which rotates at a speed determined by the frequency of the AC voltage or current and the number of poles in the stator winding. The magnitude of the magnetic field is determined by the vector sum of the currents in the windings. For constant excitation current, the magnetic field is a constant value.

The rotor has bars of copper or aluminum imbedded just below its surface, parallel to the motor shaft, all of which are connected together at each end of the rotor by a conductive ring of copper or aluminum. When the rotor is physically rotating at a different rotational velocity than the rotating magnetic field of the stator, the rotor is said to "slip", and the rotor bars will experience magnetic flux changes, which induce voltages in the bars, and cause currents to flow through the bars and the end rings. These currents, in turn, develop a magnetic field that interacts with the rotating field of the stator winding to produce torque in the motor.

Since the stator windings are also magnetically coupled to the rotating field of the stator, they also experience periodic flux changes, and a voltage is induced in them which is known as the "counter emf", or CEMF, since it opposes the applied voltage. This CEMF voltage is analogous to the CEMF induced in a transformer winding when it is energized.

Another similarity to a transformer exists. In an induction motor, the total stator current consists of two components; the component that establishes the rotating magnetic field, hereinafter referred to as "magnetizing" current, and a component that results from current flowing in the rotor, hereinafter referred to as "load" current. This is analogous to the transformer which also has a magnetizing current and a load current.

In the same fashion as a DC motor, the torque developed by an AC induction motor is proportional to the strength of the stator magnetic field, and also proportional to the rotor magnetic strength, determined by the rotor or load current. With constant stator field strength, rotor current, at least for small values of slip, is proportional to the difference in angular velocities of the rotating field and the rotor speed, and therefore the torque delivered by an induction motor is proportional to slip. This very nearly linear relationship holds true for values of slip velocity of several percent of full rated motor speed.

If the frequency of the current establishing the rotating magnetic field of the stator is known, and if the rotor current can be measured, because slip is proportional to rotor current, the motor speed can be ascertained because the motor speed will be equal to the algebraic sum of the rotational speed of the stator field and the slip speed.

FIG. 1A shows a conventional equivalent circuit of an AC induction motor, which is simplified for conditions of small slip speeds, where the frequency of the voltages induced in the rotor is small, and any rotor inductance can be neglected. Only one phase of the motor is shown, since in a balanced construction the other phases are the same, except for a 120° phase displacement. This equivalent circuit is referenced to the stator of the motor, since this is the only part that is readily accessible for application of power and for measurement of currents and voltages existing in the motor.

Equivalent circuit 100 shows an applied AC voltage identified by the numeral 102 connected to terminals 104 and 106 of one phase of the AC motor. Total stator current $I_S$ identified with the numeral 108 flows through stator resistance $R_S$ identified by the numeral 110 and stator leakage inductance has identified by the numeral 112. Stator impedance voltage drop $E_S$ identified by the numeral 114 results from current 108 flowing through the combined stator impedance of resistance 110 and inductance 112.

At node 116, the stator current divides into its two components, the magnetizing current $L_M$ identified with the numeral 118, flowing through magnetizing inductance $I_M$ identified by the numeral 120 of the stator windings, and load current $I_L$ identified with the numeral 122, which is a result of current flowing in the motor rotor. The load current $I_L$ is proportional to rotor current and hence to slip speed. The magnetizing current $I_M$ identified by the numeral 118 flowing through magnetizing inductance 120 induces CEMF 124 across inductance 120.

Figure 1B:
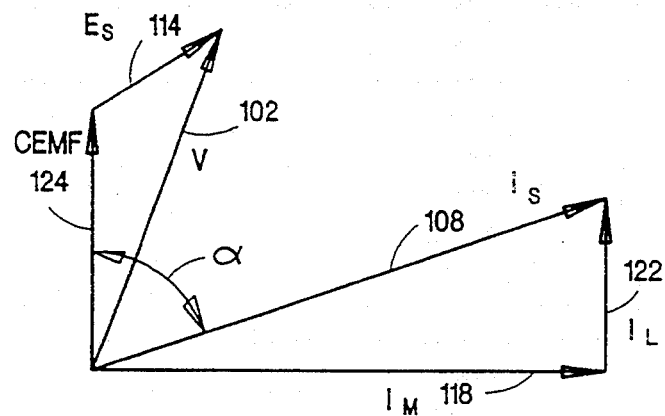
FIG. 1B is a vector diagram of voltages and currents bin the motor when driving a load.

FIG. 1B is a phaser or vector representation of the voltages and currents of induction motor represented in FIG. 1A for conditions where the slip speed is negative, meaning that the rotor speed is less than that of the stator magnetic field so that the motor is being subjected to a load.

In operation of the AC motor, it is very desirable for the magnetizing current $I_M$ to be at its rated magnitude at all times, in order to develop full rated torque. For this reason magnetizing current $I_M$ vector 118 is chosen as the reference vector for the diagram. CEMF 124 is determined by the following relationship:

$$CEMF = L_M \, dI_M/dt \qquad (1)$$

where $L_M$ is the magnetizing inductance 120 and $I_M$ is the magnetizing current 118. The magnetizing current 118 is sinusoidal and can be represented by:

$$I_M = I_M \sin wt \qquad (2)$$

where w is the angular velocity, or frequency of the magnetizing current. If equations (1) and (2) are combined, the CEMF becomes:

$$CEMF = L_M \, w \, I_M \cos wt \qquad (3)$$

The cosine term in this expression indicates that the vector for CEMF 124 is leading the magnetizing current $I_M$ vector 118 by exactly 90 electrical degrees, regardless of frequency. Equation (3) also shows that if the magnitude of the magnetizing current $I_M$ is maintained at constant magnitude for all frequencies, the magnitude of the CEMF is directly proportional to the frequency w. Conversely, if the frequency w is maintained at a magnitude which bears a fixed ratio to the CEMF, the magnetizing current will be constant at all frequencies.

For small values of slip, where rotor frequency is small, rotor inductance has no significant effect, and the rotor current can be considered to be purely resistive, and therefore in phase with the CEMF. Load current $I_L$ vector 122 is shown adding vectorially to magnetizing current $I_M$ vector 118, with the vector sum being the stator current $I_S$ vector 108. Since this vector diagram applies in principle to all frequencies and at all loads, it is shown at some arbitrary angle $\alpha$. Note that for any value of load current, the stator current $I_S$ vector 108 is displaced from the CEMF vector 124 by less than 90 electrical degrees.

Stator current flowing through stator resistance 110 and stator inductance 112 causes a voltage drop 114, whose angle is dependent upon frequency, but will typically be slightly leading stator current $I_S$ vector 108 due to stator inductance 112. Stator impedance voltage drop 114 is added vectorially to CEMF vector 124 to show the applied voltage vector 102.

Figure 1C:
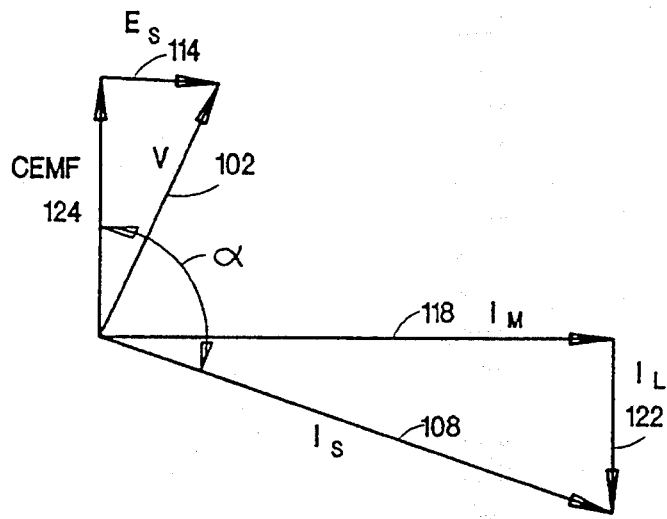
FIG. 1C is a vector diagram of voltages and currents in the motor when the motor is regenerating.

FIG. 1C is the same vector diagram except in this case the slip speed is positive, representing a rotor speed greater than the rotating magnetic field, and a condition where the induction motor becomes a generator, i.e. the motor is regenerating.

In FIG. 1C, the load current $I_L$ vector 122 is now 180 degrees out of phase with the CEMF vector 124. As in FIG. 1B, the total stator current $I_S$ 108 is the vector sum of the magnetizing current $I_M$ 118 and the load current $I_L$ 122. Note that in this case, the stator current $I_S$ vector 108 is displaced from the CEMF vector 124 by more than 90 electrical degrees. Again, the stator impedance voltage drop 114, is added to the CEMF vector 124 to obtain the applied terminal voltage 102.

The significance of the phase relationship between stator current $I_S$ and the CEMF is that if the phase difference $\alpha$ between the two is measured, and the difference compared to a 90 degree displacement, the direction of rotor current and therefore the direction of slip speed can be detected. When the phase displacement $\alpha$ is less than 90 electrical degrees, the slip is in the load or motoring direction, with the rotor operating at a speed less than the stator winding field angular velocity. When the phase displacement $\alpha$ is more than 90 electrical degrees, the slip is in the regenerative direction, and the rotor is operating at a speed greater than the stator winding field angular velocity.

The CEMF voltage can be determined by subtracting the stator impedance drop voltage 114 (as determined by multiplying the measured stator current $I_S$ by the known stator impedance) from the terminal voltage. Once the CEMF is determined, the relationships described by equation (3) will provide the magnetizing current $I_M$, since the frequency of the stator and magnetizing currents is known and the magnetizing inductance $L_M$ is a constant motor characteristic that can be measured or determined from the design of the motor.

In either FIG. 1B and 1C, when the magnetizing current $I_M$ 118 has been ascertained, the load current $I_L$ 122 can be derived from the values of the total stator current $I_S$ 108 and the magnetizing current $I_M$, since the vector diagrams of FIGS. 1B and 1C show a right triangle relationship between the three currents, and load current 122 is related to the other two as follows:

$$I_L = \sqrt{I_S^2 - I_M^2} \tag{4}$$

where $I_S$ is the stator current 108, $I_M$ is the magnetizing current 118, and $I_L$ is the load current 122.

Since for normal values of load, slip is proportional to load, or rotor, current, the rotor speed can be determined by adding or subtracting a signal proportional to the load current to or from a signal proportional to the frequency at which the stator winding is energized. The determination of whether to add or subtract the signal proportional to load current depends on the phase relationship $\alpha$ between CEMF and stator current described above, i.e. whether the phase relationship is less or greater than 90 degrees.

With the speed of the rotor known, the speed of the motor can be controlled by varying the stator winding frequency and current to establish motor speed at the desired value.

Figure 2:
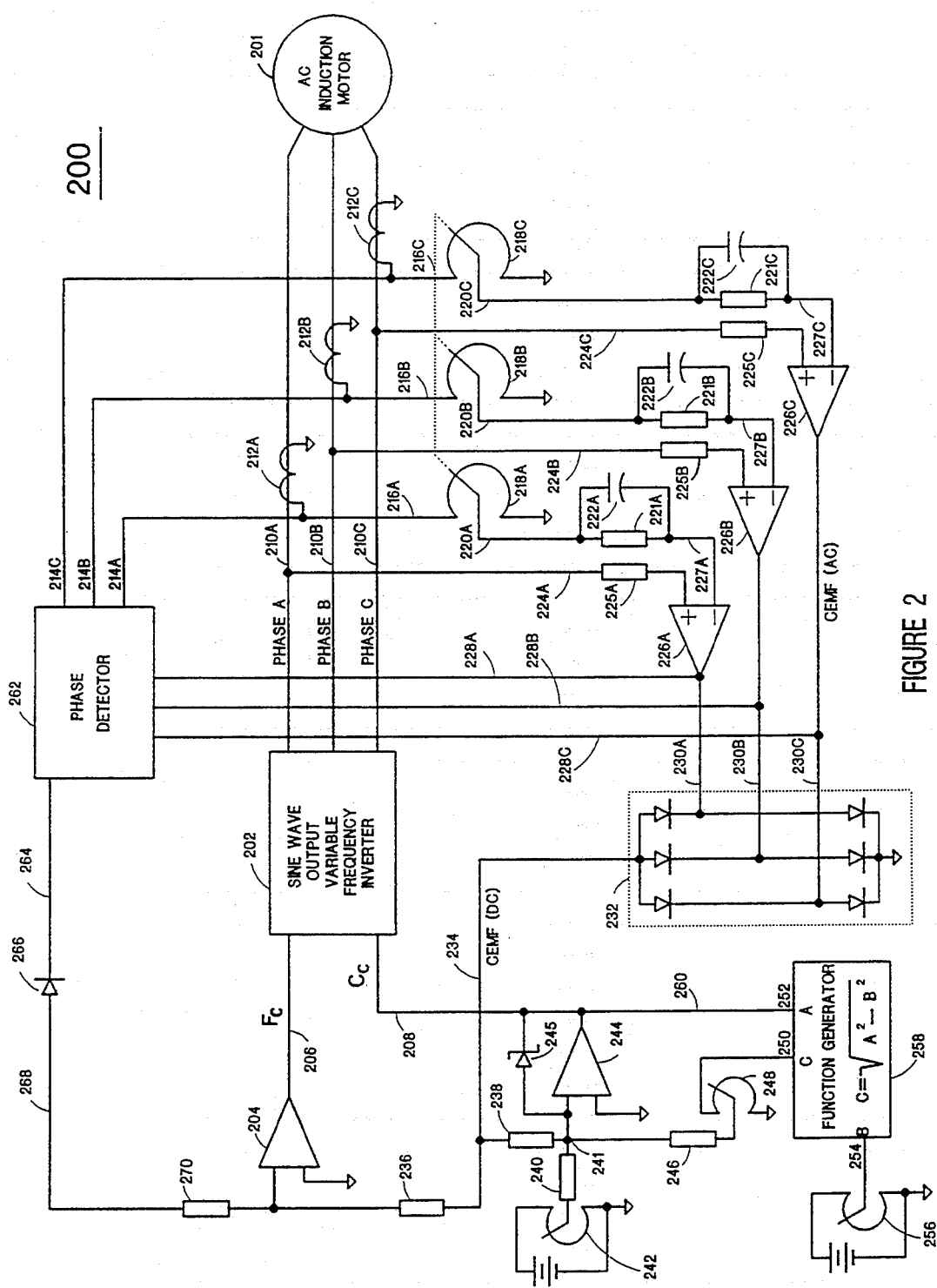
FIG. 2 is a schematic diagram of a speed control system for an AC induction motor of the present invention.

FIG. 2 shows a control system that uses the principles described above to ascertain the induction motor speed at various loads and to regulate the motor speed to a desired value independent of load and using only terminal voltages and currents for feedback.

In FIG. 2, speed control 200 contains a sine wave output variable frequency inverter 202, which has two independent control inputs, a frequency command signal $F_C$ at conductor 206, which determines the frequency of the inverter output to AC induction motor 201 through conductors 210A, 210B, and 210C, and a current command signal $C_C$ at conductor 208, which causes the inverter output current to be proportional to the current command signal $C_C$, at whatever frequency has resulted from the frequency command. Conductors 210A, 210B, and 210C contain phases A, B, and C, respectively, and are connected to the stator winding of motor 201.

Numerous commercially available inverters may be employed as inverter 202 and any conventional inverter design that meets the above requirements may be used.

The basic principle of operation of control system 200 is to regulate the CEMF of the induction motor to a value proportional to frequency, thereby maintaining constant magnetic excitation for the motor, and additionally to vary the CEMF of the motor and frequency of inverter 202 in accordance with the load, so that the speed of the motor remains independent of load. This is accomplished as follows:

Regulating amplifier 244 receives a CEMF command or reference signal, representing the synchronous speed of the motor, from speed adjusting potentiometer 242, through scaling resistor 240 and summing junction 241.

A feedback signal proportional to the motor CEMF is obtained as follows and provided to summing junction 241. Summing amplifier 226A senses the Phase A output voltage of the inverter in conductor 210A through conductor 224A, and scaling resistor 225A. This voltage corresponds to voltage 102 shown in FIG. 1. The stator winding current in Phase A is sensed by current transformer 212A and applied to impedance calibration potentiometer 218A through conductor 216A. An adjustable portion of this stator winding phase current signal is selected by potentiometer 218A, and connected through conductor 220A to a resistor and capacitor network 221A and 222A. This network converts the voltage from potentiometer 218A to a current proportional to the stator impedance voltage drop, shown as voltage 114 in FIG. 1. The resistive portion of the current, through resistor 221A represents the resistive portion 110 of the stator impedance voltage drop 114, while the capacitive current through capacitor 222A represents the inductive portion 112 of the stator voltage impedance drop. The combined current from resistor 221A and capacitor 222A flows through conductor 227A and is subtracted by the summing amplifier 226A from the phase voltage signal through resistor 225A so that the output of the summing amplifier 226A becomes an AC signal that represents the phase output voltage 102 of inverter 202 less the stator impedance voltage 114 drop due to stator current, and is thus proportional to the CEMF 124 in phase A.

Impedance calibration potentiometer 218A provides adjustment to meet specific characteristics of the motor being used, since stator impedance varies over a wide range, even with motors of the same horsepower and speed.

Phases B and C have similar sensing circuits, numbered the same as Phase A, except for the A, B, or C designations. The three potentiometers 218A, 218B, and 218C may be mechanically coupled in tandem as indicated in FIG. 2, so that all three can be adjusted simultaneously, since the motor impedance is the same for all three phases.

While a current transformer is shown for sensing the currents in conductor 210, it will be appreciated that other means of measuring phase currents may be used to develop the signal proportional to the stator impedance voltage drop, such as a series resistor or a combination of a series resistor and series inductor. If the inverter 202 uses internally generated individual phase AC current command signals, these signals are also equivalent to the actual phase current, and can be used instead of directly sensing phase currents.

The signal outputs of summing amplifiers 226A, 226B, and 226C, representing motor CEMF, are AC in nature, and thus cannot be used directly for feedback to summing junction 241 and regulating amplifier 244. While a single phase CEMF signal could be rectified for feedback purposes, the ripple voltage of the rectified DC would be excessive, and would require filtering to obtain a reasonably smooth DC signal. At high frequencies, this is effective, but since the inverter may operate at frequencies as low as a few Hertz, the filter time constants to provide a smooth signal at these low frequencies would be too long to allow fast response to changes in operating conditions.

However, when three phase full wave rectification of the three AC CEMF signals is accomplished, the ripple magnitude becomes only a few percent of the total AC magnitude, and the frequency of the ripple is increased to six times the inverter output frequency, making filtering unnecessary or minimal. Three phase, full wave rectifier 232 takes the AC outputs from the three CEMF summing amplifiers in conductors 230A, 230B, and 230C and converts the combined outputs to a DC CEMF signal in conductor 234. This signal becomes the feedback for regulating amplifier 244 through scaling resistor 238 and summing junction 241.

The full wave three phase rectifier 232 is shown functionally in FIG. 2 as a conventional six diode bridge. At low levels of CEMF signals, the forward diode conduction voltage drop may be excessive, causing non-linear feedback. Where it is desirable to eliminate the diode drop, electronic rectification by standard precision "absolute value" operational amplifier circuitry is preferred. Examples of this circuitry can be found in various operational amplifier applications manuals, such as "OPERATIONAL AMPLIFIERS", published by Burr-Brown Research Corporation, Library of Congress No. 74-163297. See page 249.

The output of regulating amplifier 244 operates to increase or decrease the current command signal $C_C$ in conductor 208, thereby increasing or decreasing the stator current and causing the CEMF feedback signal, and the actual CEMF, to become proportional to the reference signal from potentiometer 242.

As noted in equation (3), the CEMF is related to the magnetizing current $I_M$ of the motor. A further function of speed control 200 is to provide constant magnetizing current $I_M$ in motor 201, independent of frequency, by causing the frequency of the current applied to the motor to become proportional to the CEMF, also as described in equation (3). To accomplish this, the DC CEMF output of rectifier 232 is provided by conductor 234 through scaling resistor 236 to summing amplifier 204. Summing amplifier 204 also receives another signal through resistor 270, but only when regenerative operation of the motor is attempted. During normal motoring operation, the only signal to summing amplifier is the signal proportional to CEMF. The output of summing amplifier 204 becomes the frequency command signal $F_C$ in conductor 206 to inverter 202. The frequency of operation of motor 201 is thus proportional to CEMF, resulting in constant magnetization $I_M$ at all frequencies. The resistance of resistor 236 is chosen to establish the correct proportionality so that the magnetizing current is that magnitude which provides full rated field excitation for the motor at all frequencies.

In the operation of motor 201, an increased load torque causes the rotor to slow until its slip speed, i.e. the difference between the synchronous speed and the rotor speed, develops enough load current and thus enough torque to balance the increased load. If constant output speed is to be maintained, this slip must be compensated for by increasing the frequency of the stator current and the synchronous speed of the motor. A corresponding increase in CEMF is needed to maintain the magnetizing current constant and to maintain full excitation of the motor.

Since slip speed is proportional to the rotor or load current represented by vector 122 in FIG. 1, measurement of this current will provide an indication of slip speed. With a squirrel cage induction motor, the rotor current cannot be measured directly, but equation (4) provides a means of calculating it, since two of the three variables of the equation are known. The stator winding current can be ascertained by either direct measurement or by using the current command signal to the inverter 202. Due to the proportionality between CEMF and frequency established by the frequency command signal $F_C$ in conductor 206 to inverter 202 described above, the magnetizing current will be a constant value as defined by equation (3).

Function generator 258 electronically calculates equation (4) from one input proportional to stator current $I_S$ from regulating amplifier 244, in conductor 260 and connected to input terminal 252, and from a second input, from potentiometer 256 which provides a signal representative of magnetizing current to input conductor 254 of function generator 258.

The output of function generator 258 in conductor 250 thus is a signal proportional to rotor or load current, vector 122 in FIG. 1, and can be used to boost the frequency and CEMF to compensate for slip, and therefore to keep the rotor at constant speed.

Slip compensation potentiometer 248 is connected to the output of function generator 258 by conductor 250, and a portion of this output is adjusted by potentiometer 248 and added to regulating amplifier 244 through scaling resistor 246, connected to summing junction 241. This signal through resistor 246 adds to the reference signal from potentiometer 242, and increases the CEMF, which in turn, through summing amplifier 204, increases the inverter output frequency to provide the slip compensation necessary to maintain rotor speed. Potentiometer 242 thus becomes a speed adjusting means for control 200.

Potentiometer 248 is adjusted to provide the desired amount of slip compensation, so that the motor speed either does not vary at all with load, or varies by an amount deemed appropriate for the application.

In contrast to prior art inverters that will disconnect or "trip" when an excessive overload condition appears, it is more desirable to merely have the motor slow down and operate safely until the overload is removed. Speed control 200 provides this feature in the following manner. Regulating amplifier 244 is connected to zener diode 245, which serves to limit the output of amplifier 244 to a definite level. This limits the current command to the inverter and therefore the output current of the inverter 202. If the slip of the motor and the load current increases to a magnitude where the limited output of the inverter is no longer capable of supplying the total required magnetizing and load currents, the CEMF will drop. The limited output of amplifier 244 cannot command any additional current to restore the CEMF to the proper level. The reduced CEMF, acting through summing amplifier 204, accordingly reduces the frequency of the stator winding current, the synchronous speed of the motor, and the speed of the rotor. This action progresses until the rotor speed has reduced to a level at which the load is no longer excessive, and the control can establish a stable operation, albeit less than the set speed. If the load is large enough, the motor will actually stop rotation completely, but, since the CEMF and the frequency will be very low under this condition, excessive rotor losses and motor burnout will not occur. After the load is removed, the speed control will restore the motor to its original speed.

This same regulating action allows speed control 200 to safely start a large inertia load without the need for timed accelerating circuits to prevent excessive currents during acceleration.

As mentioned earlier, it is desirable to avoid the need to dissipate regenerative energy that results from operation at speeds greater than the set speed, either when the speed adjustment potentiometer is turned to a lower speed, or when the load tends to overdrive the motor. This feature is accomplished as follows:

Phase detector 262 is a circuit that determines the phase relationship between the CEMF 124 and the stator current $I_S$ 108, both shown vectorially in FIG. 1. As shown in FIG. 1B, when the inverter and motor are operating in the motoring mode, with the rotor rotating at a speed less than that of the rotating magnetic field, the phase angle $\alpha$ between the CEMF 124 and the stator current $I_S$108 is less than 90 electrical degrees. Similarly, FIG. 1C shows that when the motor is operating as a generator, with the rotor rotating at a speed greater than that of the rotating magnetic field, the phase angle $\alpha$ between CEMF 124 and stator current 108 is more than 90 electrical degrees.

Signals representing all three phases of CEMF, from summing amplifiers 226A, 226B, and 226C are connected to phase detector 262 by way of conductors 228A, 228B, and 228C.

Additional inputs from means for sensing the stator current, in all three phases, shown as current transformers 212A, 212B, and 212C, are also applied to phase detector 262 by conductors 214A, 214B, and 214C. The phase detector determines whether the stator current $I_S$ lags the CEMF by more or less than 90 electrical degrees, and provides an output in conductor 264, polarity of which is determined by the stator current—CEMF relationship relative to a 90 electrical degree lag. In control 200, the output polarity of the phase detector 262 is positive for a motoring condition, when the phase lag is less than 90 electrical degrees, and negative for a regenerating condition, when the phase lag is more than 90 electrical degrees.

Diode 266 blocks a positive output signal from phase detector 262, but allows a negative signal to pass through conductor 268 and scaling resistor 270 to the summing amplifier 204 that provides the frequency command to inverter 202. Thus, when the motor is acting as a load, the positive signal from the phase detector will not reach summing amplifier 204, and the frequency of the inverter is determined solely by the CEMF signal in conductor 234 to the summing amplifier 204.

When regeneration is attempted, with the rotational speed of the rotor exceeding that of the rotating magnetic field, the negative output from phase detector 262 is applied through conductor 264, diode 266, conductor 268, and scaling resistor 270 to summing amplifier 204, and adds to the signal from the CEMF, increasing the frequency command from summing amplifier 204 to the inverter. The result is that the frequency increases until the rotational speed of the rotating field is equal to the rotor speed, at which time the phase detector 262 output drops to a level just sufficient to maintain the proper frequency. If the phase detector 262 contains an integrating amplifier at its output, the steady state phase difference is reduced to exactly 90 electrical degrees.

When this condition exists, there is no generation of power by the motor, nor is there any power consumed by the motor, since the rotor speed is matched by the speed of the rotating magnetic field.

The ability to prevent the motor from acting as a generator has several useful functions. First, when the speed adjusting potentiometer setting is reduced from a given speed to a lesser setting, the control allows the motor to coast to the new setting without the need to absorb the energy that would result if braking were attempted.

Second, if the load overdrives the motor, the control merely allows the motor speed to increase, again without any need to absorb the braking energy which would accompany any attempt to keep the speed from increasing. Additional means may be provided to prevent the speed from increasing indefinitely in the event that the load continues to overdrive the motor beyond safe limits.

The third benefit of not attempting regeneration is when the motor must be started when it is already running at some speed, either because it is coasting after removal of power, or if it is connected to some load that causes it to rotate, such as a fan or pump that has air or fluid passing through it.

With most prior art inverter controls, if an attempt is made to start a rotating motor, excitation will be applied at the set frequency, or if acceleration control is used, at a very low frequency. In either case, it is unlikely that the frequency of the rotating field will match the speed of the rotor, and excessive current and torque will result. Tripping out of the inverter usually occurs.

Elaborate schemes have been devised to sweep the excitation frequency over its range at a low magnetizing level to determine the rotor speed before applying full power to the motor. Most of these methods take several seconds to accomplish a safe startup, with lost time when fast startup is critical.

With the present invention, startup under these conditions is automatic, rapid, and free from undue stress. When the control is started, regulating amplifier 244 provides a current command to the inverter 202 to attempt to establish the CEMF which has been set by potentiometer 242. If the motor is running at a speed less than the set speed, regulating amplifier 244 quickly reaches its limiting condition, keeping the CEMF and the frequency low until the motor can accelerate at a controlled torque to the desired operating speed.

If, on the other hand, the motor is operating at a speed higher than the setting on the speed adjusting potentiometer 242, regulating amplifier 244, operating through the current command to inverter 202, can easily establish the commanded CEMF. With the rotor operating in an overspeed condition, however, the phase detector outputs a negative signal to summing amplifier 204, causing its output frequency command to increase the inverted frequency to a level that matches the speed of the rotating magnetic field to the speed of the rotor. The motor can then coast down to the desired speed.

In general, any time an AC induction motor is energized when it has been rotating prior to energization, the least electrical and mechanical stress will occur if the energization is accomplished at that frequency whose synchronous speed matches the operating speed of the rotor. The phase detection technique described above may be used to determine this frequency, as follows.

Initial excitation of the motor is at some arbitrary current and frequency, at a level of magnitude great enough to provide meaningful signals, but low enough to prevent excessive motor torque, or high rotor losses. The CEMF and stator currents are sensed, and the phase relationship determined, as with phase detector 262 in FIG. 2. Diode 266 is temporarily by-passed so that both positive and negative outputs of phase detector 262 can work through summing amplifier 204 either to decrease or increase the frequency of inverter 202, overriding the CEMF signal. When the output of phase detector 262 is positive, indicating that the frequency is too high, the inverter frequency is decreased. Similarly, with a negative output, when the inverter 202 frequency is too low, the inverter frequency is increased. Once the synchronous speed matches the rotor speed, diode 266 is restored to normal and the control is operated as previously described to control the speed of the motor.

Figure 4:
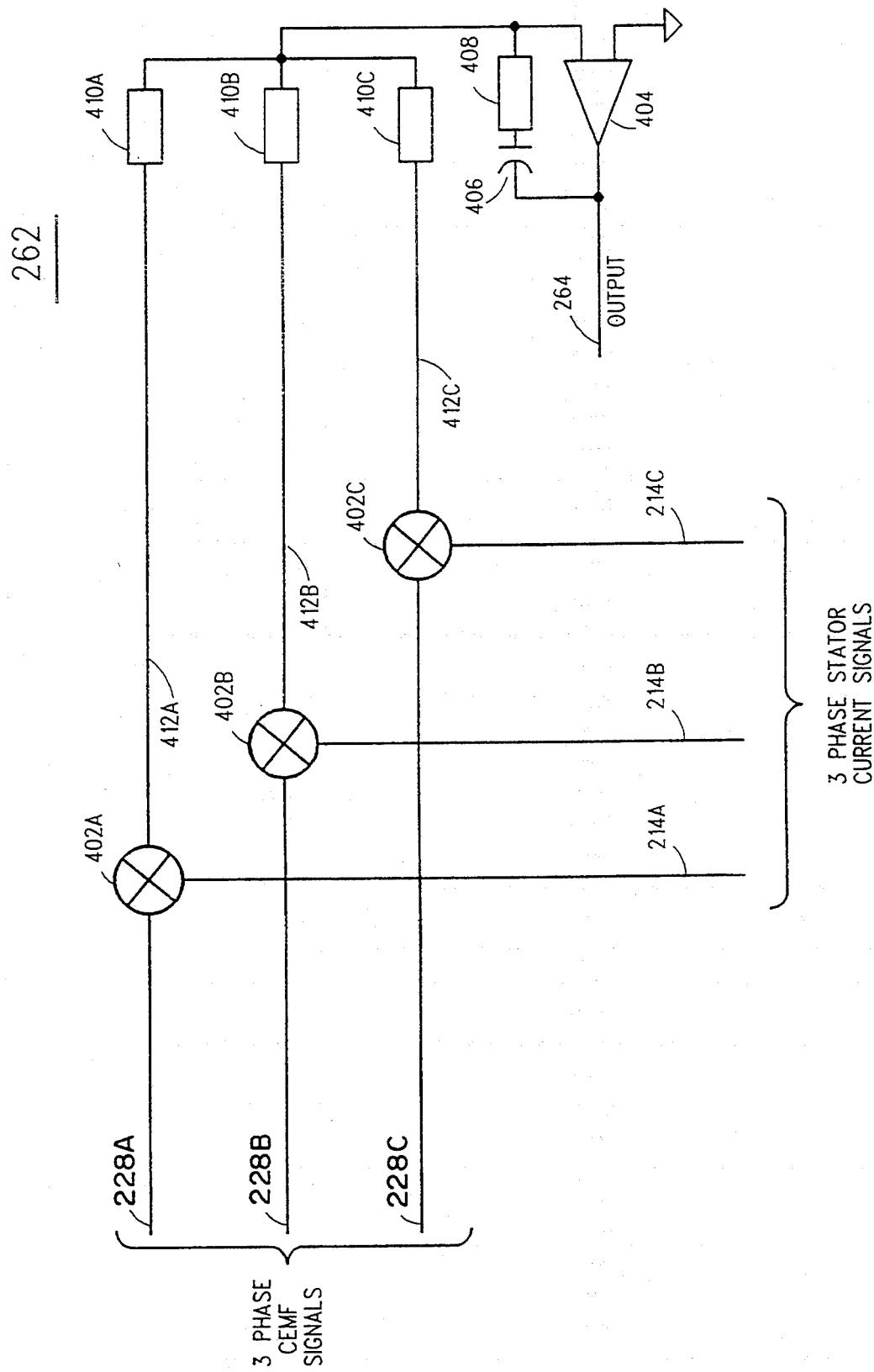
FIG. 4 is a detailed diagram of a circuit that may be used to determine whether the motor is motoring or regenerating.

A circuit that may act as the phase detector 262 of FIG. 2 is shown in FIG. 4. Signals corresponding to the three phase CEMF voltages in conductors 228A, 228B, and 228C are connected to multipliers 402A, 402B, and 402C. As shown in FIG. 4, each of these voltages is represented by a sinusoidal variable, such as $$E \sin wt$$

in conductor 228A. The corresponding variable in conductor 228B is $$E \sin (wt + 120°)$$

where the 120° term represents the customary three phase displacement of phase B from phase A. Similarly, the voltage in conductor 228C shows a 240° phase displacement from phase A as $$E \sin (wt + 240°).$$

These three expressions define the CEMF voltage relationships that exist in the balanced three phase system. The quantity E is the magnitude of the CEMF at any given time, and is equal for all phases. The quantity w is the angular velocity defining the frequency of applied voltage to the motor.

Each of the multipliers 402A, B, and C receive a second input corresponding to the three phase stator currents in conductors 214A, 214B, and 214C. For example, the input to multiplier 402A is from conductor 214A and can be defined as $$I \sin (wt - \theta)$$

where the electrical angle variable $\theta$ is the electrical angle by which the stator current $I_S$, shown as vector 108 in FIG. 1, lags the CEMF, shown as vector 124 in FIG. 1. The currents in conductors 214B and 214C are the same as that of conductor 214A, except for additional 120° and 240° phase shifts, similar to those of the CEMF voltages, and present in a balanced three phase system.

They are $$I \sin (wt + 120° - \theta)$$

$$I \sin (wt + 240° - \theta).$$

The outputs of the three multipliers 402A, B, and C are in conductors 412A, 412B and 412C, are as follows:

$$0.5EI [\cos \theta - \cos (2 wt - \theta)]$$

$$0.5EI [\cos \theta - \cos (2 wt + 240° - \theta)]$$

$$0.5EI [\cos \theta - \cos (2 wt + 480° - \theta)].$$

Note that each of the multipliers outputs contain a DC term, $$\cos \theta$$

and a sinusoidal time varying term, which is $$-\cos(2 wt - \theta)$$

in phase A and conductor 412A. This sinusoidal term is at twice the original frequency.

It would be possible to use the outputs of the multipliers directly for control if the time varying sinusoidal term is removed by filtering the multiplier output, but at very low frequencies, the filter time constant would necessarily be so long as to make the response of the phase detector too slow to accomplish its purpose.

If the three multiplier outputs are examined, it can be seen that the three sinusoidal terms have a balanced three phase relationship, with equal phase displacements, and as such, if added together, their sum will have zero net magnitude at any time.

Scaling resistors 410A, 410B, and 410C connect the multiplier outputs in conductors 412A, 412B, and 412C to summing amplifier 404, where they are added. The three DC components of the multiplier outputs are added to produce a total DC output of the phase detector, while the net result of adding the AC components is zero, and no filtering is required to obtain a DC output for phase detector 262, independent of operating frequency.

Since the phase detector's purpose is to determine whether the electrical angular difference between the two input signals to the multipliers is more or less than 90 electrical degrees, the cos $\theta$ function naturally provides this information, since the cosine of 90° is zero. Angles of $\theta$ less than 90 degrees result in a positive signal, since the cosine of 0°–90° is positive. Similarly, angles of $\theta$ more than 90° result in a negative output, since the cosine of angles from 90°–180° is negative.

Summing amplifier 404 is shown as an integrating amplifier, to insure that the feedback action of control 200 causes the phase difference between CEMF and stator current to regulate to exactly 90°, or zero output, during times when the phase detector is preventing any regenerative braking activity.

It can be appreciated that other means of determining phase differences, such as phase locked loops, or zero crossing timing circuits could be used without changing the basic intent or purpose of this feature of the invention.

Figure 3A:
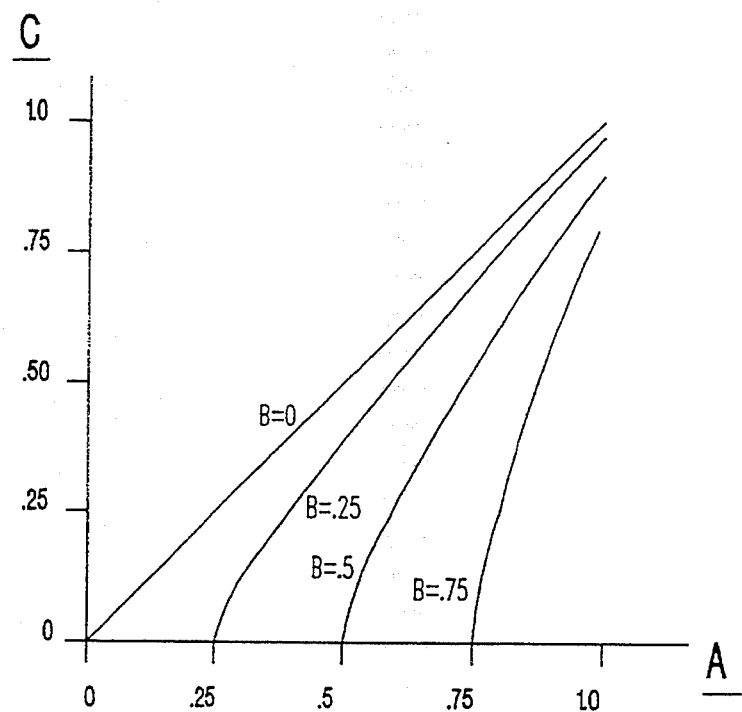
FIGS. 3A, 3B, and 3C are detailed drawings of a technique that may be used to determine load current magnitude.
Figure 3B:
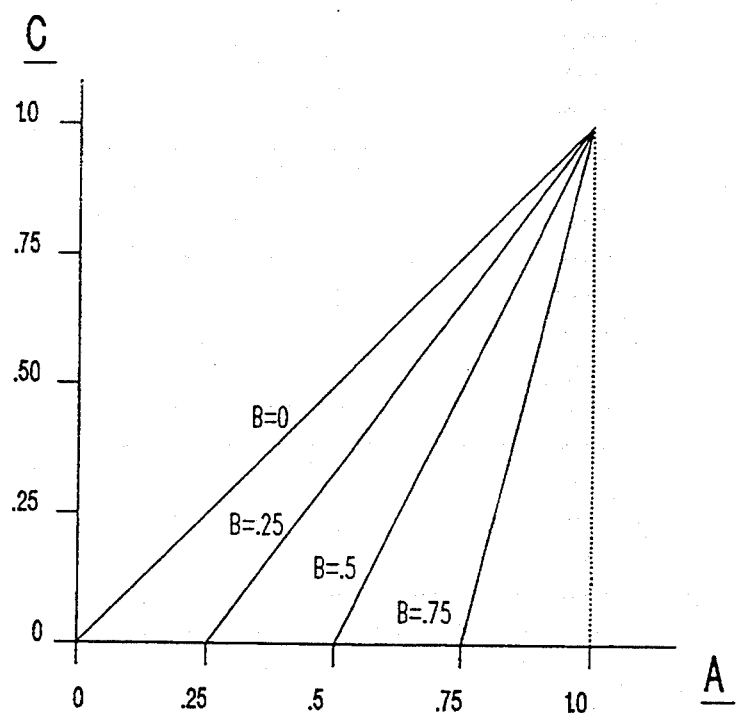
Figure 3C:
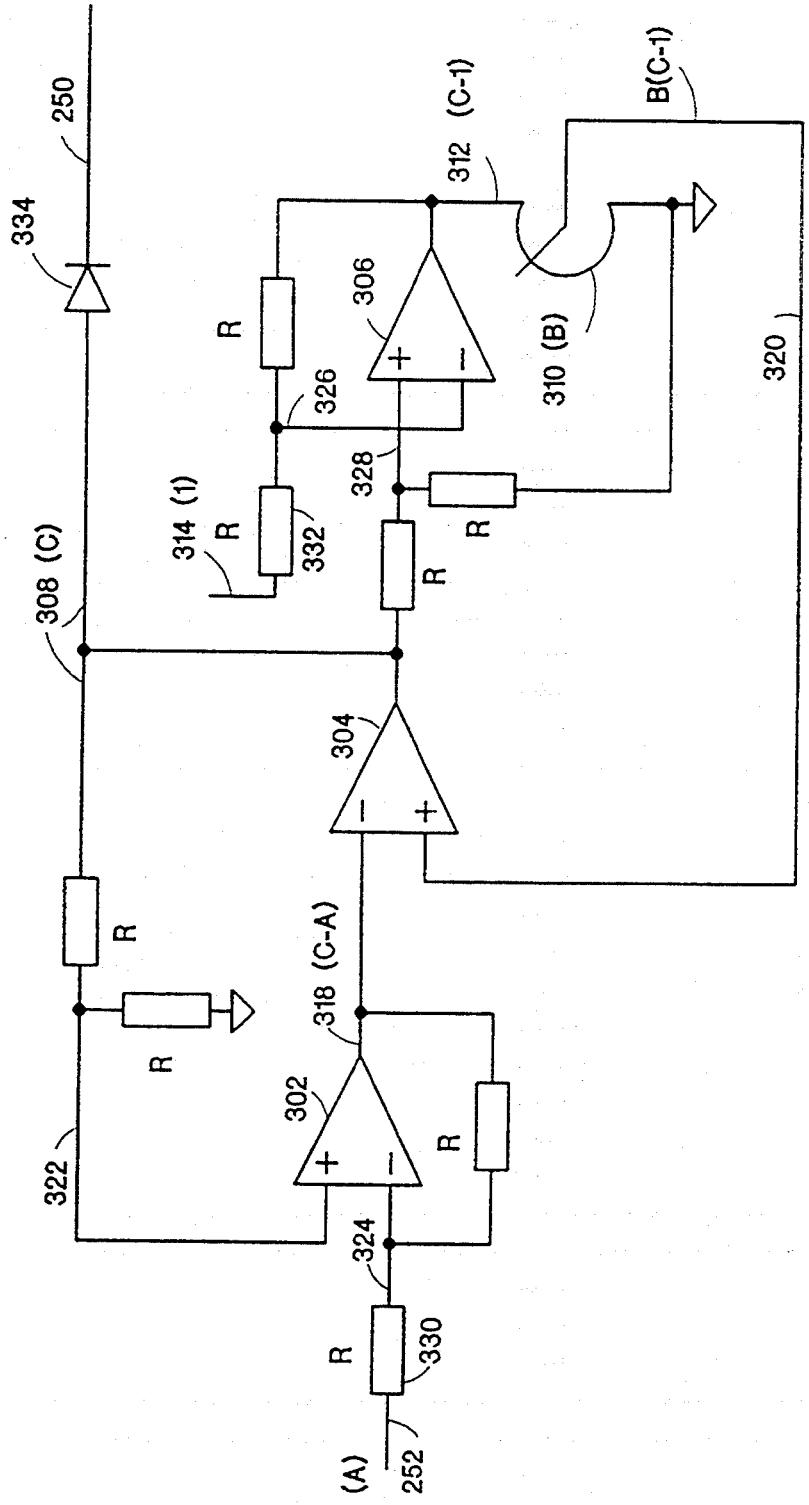

A function generator, shown as block 258 in FIG. 2, that can be used to determine the load portion of the stator current is shown in FIG. 3C.

FIG. 3A, accompanying FIG. 3C, shows a family of curves that represent the relationships between the stator current $I_S$, the load current $I_L$, and several levels of magnetizing current $I_M$ as defined by equation (4), restated in FIG. 3A. To remove the dimensions from this relationship, three new variables A, B, and C are defined for the three currents, each as a fraction of the maximum stator current allowed by the limiting action of amplifier 244 of FIG. 2.

Since boundaries exist for these variables, the range of possible values for each variable are as shown in the following derivation $$I_L = \sqrt{I_S^2 - I_m^2} \quad (4)$$

Let $I_{SM}$ = Max. Stator Current Range

Let $A = \dfrac{I_S}{I_{SM}} \quad B < A < 1$

Let $B = \dfrac{I_M}{I_{SM}} \quad 0 < B < 1$

Let $C = \dfrac{I_L}{I_{SM}} \quad 0 < C < 1$

Then $C = \sqrt{A^2 - B^2} \quad (5)$

Note that the stator current can never be less than the magnetizing current, since it is the vector sum of the magnetizating current and the load current. Equation (5) restates equation (4) in the dimensionless variables.

It is possible to use multipliers and square root circuits to calculate equation (5) exactly. The results of such calculations are shown in FIG. 3A as a family of curves for various magnetizing currents, each expressed as a fraction of the maximum stator current. However, the maximum value for C, which represents the load current, can be seen in FIG. 3A to be somewhat dependent on the variable B, which represents the magnetizing current of the stator winding. For a practical control to be adjustable to work with many motors that have widely different magnetizing currents, it is desirable that the maximum value of C be unrelated to the magnetizing current. This avoids an extra calibrating adjustment, which may be difficult for a non-technical user of the control to understand and make.

FIG. 3B shows a linearized family of curves that closely approximate those of FIG. 3A. These curves show the maximum value of C, or load current as independent of the magnetizing current represented by B, and as converging at a single, common maximum value of C. Use of the linearized curves of FIG. 3B also has the advantage of being realizable by means of simple operational amplifiers, rather than complex multipliers and the like. Each curve of the family of curves shown in FIG. 3B has a slope of $1/1-B$, the magnitude of B corresponding to that particular curve's value of B.

Equation (6) defines the value of C for the set of linearized curves shown in FIG. 3B. It is re-arranged in equation (7) for ease of implementation by operational amplifiers as follows $$C = \dfrac{1}{1 - B}(A - B) \quad (6)$$

$$C - A = B(C - 1) \quad (7)$$

FIG. 3C is an operational amplifier circuit that may be used as the function generator 258 in FIG. 2. Several resistors R are shown, and each is the same value of resistance, for example 10 k ohms, since equation (7) does not have any scaling constants, except for the adjustable constant B related to the magnetizing current.

The input at conductor 252 corresponds to the stator current $I_S$ and is represented by variable A. The output of amplifier 304 in conductor 308 is the variable C, which corresponds to the load current $I_L$. Variable B is adjusted by magnetizing current calibration potentiometer 310. Diode 334 allows only a positive output at conductor 308 to reach output conductor 250, satisfying the range for variable C, being from 0 to 1, as shown above. Conductor 250 is connected to slip compensation potentiometer 248 and to summing junction 241.

Operational amplifier 302 is connected in a standard differential configuration, and receives a non-inverting input from conductor 308, which is variable C, through conductor 322. Amplifier 302 receives an inverting input from variable A at conductor 252, through conductor 324. The output of differential amplifier 302 is thus equal to (C−A), the left hand term of equation (7). This output appears in conductor 318.

Operational amplifier 306 is also connected in a differential mode, and also receives its non-inverting input from conductor 308, variable C, through conductor 328. An inverting input is provided at a constant value of 1 at input 314, and through conductor 326. The output of amplifier 306 is thus (C−1) of equation (7), and is connected to potentiometer 310 by conductor 312. Potentiometer 310 selects a fraction of this intermediate variable (C−1), adjustable from 0 to 1, which is the range specified in FIG. 3A for variable B. The selected fraction is equal to the right hand term of equation (7), namely B(C−1). This output appears in conductor 320.

Operational amplifier 304 acts in a feedback mode, with negative feedback from operational amplifier 302 through conductor 318, and positive feedback from that portion of the output of operational amplifier 306 which is selected by magnetizing current calibration potentiometer 310, and connected to amplifier 304 through conductor 320. Operational amplifier 304 regulates the voltage difference at its input terminals to zero, making the signal at conductors 318 and 320 equal. Since the signal at conductor 318 is (C−A) and the signal at conductor 320 is B(C−1), equation (7) is satisfied, and the value for C is that specified in equation (6).

Even though amplifier 304 has positive feedback, the amount of negative feedback from amplifier 302 is always greater than the positive feedback, since only a fraction of the output of amplifier 306 is used for the positive feedback, and stability is therefore guaranteed to be unconditional.

The values of resistors 330 and 332 are chosen to provide the proper scaling and to reintroduce the dimensions lost when equation (4) was converted to equation (5). The output of the function generator at conductor 250 is connected to the slip compensation adjustment potentiometer 248 shown in FIG. 2.

It is recognized that other means of generating the function defined by block 258 are possible, including but not limited to analog or digital multipliers and dividers, or microprocessor signal processors, without changing the intent or usefulness of this feature of the invention.

I claim:

1. A control for controlling the speed of the rotor of an AC induction motor and avoiding regenerative operation of the motor; said motor having a stator winding electromagnetically coupled to the rotor, the stator winding having input terminals by which the motor is coupled to an AC power means; the AC power means providing a stator winding current having an operating frequency to the stator winding of the motor, the magnitude of the stator winding current and its operating frequency being determined by current command and frequency command signals, respectively, for the AC power means; there being a synchronous speed of the motor corresponding to the operating frequency of the stator winding current, said control comprising:

means for providing a signal corresponding to the desired speed of said motor;

means for providing a signal corresponding to the CEMF developed in the stator winding as a result of the flow of the magnetizing current component of the stator winding current through the stator winding, said CEMF signal comprising a frequency command signal for the AC power means for varying the operating frequency of the stator winding current in direct proportion to the magnitude of the CEMF signal, so that the magnetizing current component of the stator winding current, and thus the stator flux, may be maintained at a constant value at all operating frequencies;

regulating means having input means receiving said desired speed signal as a reference signal and said CEMF signal as a feedback signal, said regulating means having an output providing a signal for the AC power source that comprises the current command signal for establishing the magnitude of the stator winding current;

means for ascertaining the load current component of the stator winding current and providing a signal proportional to the magnitude thereof, said load current component signal being applied to said input means of said regulating means in a manner additive to said desired speed signal;

means for determining whether the phase displacement between the CEMF and the stator winding current is less than, or greater than, a predetermined phase displacement amount, said predetermined phase displacement amount being the phase displacement existing between the CEMF and the stator winding current when the speed of the rotor is at the synchronous speed of the motor; and means for allowing the frequency command signal for the AC power means to be determined solely by the magnitude of the CEMF signal when the phase displacement between the CEMF and the stator winding current is less than the predetermined phase displacement amount and for increasing the frequency command signal for the AC power means when the phase displacement between the CEMF and the stator winding current is greater than the predetermined phase displacement amount, thereby increasing the operating frequency of the stator winding current and avoiding regenerative operation of the motor.

2. The control according to claim 1 wherein the speed of the rotor may differ from the synchronous speed by the slip of the motor and wherein said control includes means for limiting the magnitude of the current command signal for the AC power means, thereby to limit the magnitude of the total stator winding current while continuing to maintain the magnitude of the magnetizing current component at a constant value, thereby also limiting the load current component of the stator winding current, and hence the slip of the motor.

3. The control according to claim 2 wherein said means for limiting the magnitude of the current command signal for the AC power means is further defined as means for limiting the output of said regulating means.

4. The control according to claim 1 wherein a voltage exists at the input terminals of the stator winding as a result of the provision of the stator winding current, and wherein said means for providing a signal corresponding to the CEMF is further defined as means for providing a signal proportional to the voltage existing at the terminals of the stator winding, means for providing a signal representative of the stator impedance voltage drop, and means for vectorially subtracting the latter signal from the former signal to provide said signal corresponding to CEMF.

5. The control according to claim 4 wherein the AC induction motor has a plurality of phase windings in the stator winding, wherein the AC power means is a polyphase AC power means, and wherein said means providing a signal corresponding to the CEMF includes a polyphase rectifier bridge connected to the output of said subtracting means.

6. The apparatus according to claim 1 wherein said means for ascertaining and providing a signal proportional to the magnitude of the load current component of the stator winding current in the stator winding comprises means for determining the load current component magnitude by the vector subtraction of the magnetizing current component of the stator winding current from the total stator winding current.

7. The apparatus according to claim 1 wherein said means for providing a signal proportional to the magnitude of the load current component of the stator winding current in the stator winding comprises means for generating a linear function approximating the relationship among the total stator winding current, the load current component, and the magnetizing current component in the motor and selected in accordance with the operating characteristics of the AC induction motor.

8. The apparatus according to claim 7 wherein said means for ascertaining and providing a signal proportional to the magnitude of the load current component of the stator winding current in the stator winding comprises:
   means for providing a first signal proportional to the magnitude of the total stator winding current in the stator winding;
   first differential means having a pair of inputs and providing an output proportional to the difference in the signals applied to said inputs, one of said inputs of said first differential means being connected to said means providing said first signal;
   regulating means having a pair of inputs and an output, the output of said first differential means being connected to one of the inputs of said regulating means;
   second differential means having a pair of inputs and providing an output proportional to the difference in the signals applied to said inputs, one of said inputs of said second differential means being connected to the output of said regulating means;
   means for supplying a fixed signal proportional to the magnitude of a maximum stator current and for providing said signal to other input of said second differential means so that the output of said second differential means is a signal proportional to the difference between the output of said regulating means and the signal proportional to maximum stator current;
   means for selecting a portion of the signal output of said second differential means proportional to a desired magnetizing current component for the stator winding current and for providing the signal so selected to the other of the inputs of said regulating means so that, through the regulating action of said regulating means, the input signals to said regulating means become equal and the output of said regulating means comprises a signal proportional to the load current component of the stator current, the output of said regulating means being provided to the other input of said first differential means; and
   means for obtaining a signal proportional to the magnitude of the load current component of the stator current from the output of said regulating means.

9. The control according to claim 1 wherein the AC induction motor has a plurality of phase windings in the stator winding, wherein the AC power means is a polyphase means, and wherein said phase displacement determining means comprises:
   multiplier means for multiplying a signal corresponding to the stator winding current in each of the phase windings with a signal corresponding to the CEMF in the corresponding phase winding;
   adding means for adding the outputs of said multiplier means to provide a phase difference signal indicative of the phase displacement between the CEMF and the stator current.

10. The control according to claim 9 wherein said adding means provides a phase difference signal based on a trigonometric function of the phase displacement between the CEMF and the stator winding current such that the signal has one characteristic for phase displacements less than the predetermined phase displacement amount and a different characteristic for phase displacements greater than the predetermined phase displacement amount.

11. The control according to claim 9 further including integrating means connected in the output of said phase displacement determining means.

12. A method for controlling the speed of the rotor of an AC induction motor and avoiding regenerative operation of the motor; said motor having a stator winding electromagnetically coupled to the rotor, the stator winding having terminals coupled to an AC power means for receiving a stator winding current from the AC power means; the operating frequency and the magnitude of the stator winding current being determined by frequency command and current command signals, respectively, for the AC power means; there being a synchronous speed of the motor corresponding to the operating frequency of the stator winding current; said method comprising the steps of:
   establishing a reference signal proportional to the desired speed of the rotor;
   determining the magnitude of the CEMF developed in the stator winding as a result of the flow of the magnetizing current component of the stator winding current through the stator winding and providing a signal proportional to same;
   applying the CEMF signal, as a feedback signal, in opposition to the speed reference signal to form an error signal comprising the current command signal for the AC power means;
   supplying the CEMF signal to the AC power means as a frequency command signal for varying the operating frequency of the AC power means in direct proportion to the magnitude of the CEMF so that the magnetizing current component of the stator winding current, and thus the stator flux, may be maintained at a constant value at all operating frequencies;
   determining the magnitude of the load current component of the stator winding current and providing a signal proportional to the magnitude of the load current component;
   applying the load current component signal to the speed reference signal in a manner that is additive to the reference signal;
   determining whether the phase displacement between the CEMF and the stator winding current is less than or greater thank a predetermined phase displacement amount, said predetermined amount of phase displacement being the phase displacement existing between the CEMF and the stator winding current when the speed of the rotor is at the synchronous speed of the motor; and
   allowing the frequency command signal to the AC power means to be determined solely by the magnitude of the CEMF signal when the phase displacement between the CEMF and the stator current is less than the predetermined phase displacement amount and increasing the frequency command signal to the AC power means when the phase displacement is greater than the predetermined amount, thereby increasing the operating frequency of the AC power means and avoiding regenerative operation of the motor.

13. The method according to claim 12 further defined as limiting the magnitude of the current command signal thereby to limit the magnitude of the total stator winding current while continuing to maintain the magnitude of the magnetizing current component at a constant value, thereby also limiting the load current component of the stator winding current, and hence the slip of the motor.

14. The method according to claim 12 wherein a voltage exists at the terminals of the stator winding as a result of the provision of the stator winding current and wherein the step of determining magnitude of the CEMF is further defined as determining the stator impedance voltage drop of the stator winding and vectorially subtracting same from the terminal voltage of the stator winding.

15. The method according to claim 12 wherein the step of determining the magnitude of the load current component of the stator winding current comprises vectorially subtracting the magnetizing current component of the stator winding current from the total stator winding current.

16. The method according to claim 12 wherein the step of determining the magnitude of the load current component of the stator winding current in the stator winding comprises generating a linear function approximating the relationship among the total stator winding current, the load current component, and the magnetizing current component in the motor and selected in accordance with the operating characteristics of the AC induction motor.

17. The method according to claim 12 wherein the AC induction motor has a plurality of phase windings in the stator winding and the AC power means is a polyphase AC power means, and wherein the step of determining the phase displacement between the CEMF and the stator winding current comprises:
multiplying a signal corresponding to the stator winding current in each of the phase windings with a signal corresponding to the CEMF in the corresponding phase winding;
adding the products of the foregoing multiplication to provide a phase difference signal indicative of the phase displacement between the CEMF and the stator winding current.

18. The method according to claim 17 further including step of integrating the phase difference signal.

19. A method for determining the speed of the rotor of an AC induction motor, said motor having a stator winding electromagnetically coupled to the rotor and forming a magnetizing inductance for the motor, the stator winding having terminals coupled to an AC power means, said AC power means providing a stator current having an operating frequency to the stator winding, the magnitude and operating frequency of the stator current being variable, there being a synchronous speed of the motor corresponding to the operating frequency of the AC power means, the rotor speed differing from the synchronous speed by the slip speed of the rotor; said method comprising the steps of:
determining the magnitude of the total stator current at the terminals of the stator winding;
determining the magnitude of the magnetizing current component of the stator current, the flow of the magnetizing current component through the magnetizing inductance of the motor inducing a CEMF across the inductance which is out of phase with the magnetizing current component;
determining the magnitude of the load current component of the stator current from the magnitudes of the total stator current and the magnetizing current component, the load current component magnitude being proportional to rotor slip speed;
determining whether the phase displacement between the CEMF and the stator current is less thank or greater than, a predetermined phase displacement amount, said predetermined phase displacement amount being the phase displacement existing between the CEMF and the stator current when the speed of the rotor is at the synchronous speed of motor; and
algebraically summing the synchronous speed of the motor and rotor slip speed, as obtained from the load current component magnitude determination, to obtain the speed of the rotor, said algebraic summation comprising subtracting the slip speed from the synchronous speed when the phase displacement is less than the predetermined phase displacement amount and adding the slip speed to the synchronous speed when the phase displacement is greater than the predetermined phase displacement amount.

20. The method according to claim 19 wherein the step of determining the magnitude of the magnetizing current component is further defined as determining the magnitude of the CEMF, dividing the magnitude of the CEMF by a quantity proportional to the operating frequency of the AC power means, and further dividing the magnitude of the CEMF by a quantity proportional to the magnitude of the magnetizing inductance of the motor.

21. The method according to claim 20 wherein the step of determining magnitude of the magnetizing current component is further defined as obtaining a signal proportional to the magnitude of the CEMF, as dividing the signal proportional to magnitude of the CEMF by a signal proportional to the operating frequency of the stator current, and as further dividing the signal proportional to the magnitude of the CEMF by a signal proportional to the magnitude of the magnetizing inductance of the motor.

22. The method according to claim 20 wherein a voltage exists at the terminals of the stator winding as a result of the energization thereof by the AC power means, and wherein the step of determining the CEMF is further defined as determining the stator impedance voltage drop and as vectorially subtracting the stator impedance voltage drop from the terminal voltage at the stator winding.

23. The method according to claim 22 wherein the step of determining the CEMF is further defined as vectorially subtracting a signal proportional to the stator impedance voltage drop from a signal proportional to the terminal voltage of the stator winding.

24. The method according to claim 19 wherein the load current component is out of phase with the magnetizing current component by 90 electrical degrees and wherein the step of determining the magnitude of the load current component is further defined as determining the square root of the difference between the square of the total stator winding current magnitude and the square of the magnitude of the magnetizing current component.

25. The method according to claim 24 wherein the step of determining the magnitude of the load current component is further defined as obtaining a signal proportional to the square root of the difference between the square of a signal proportional to the total stator current magnitude and the square of a signal proportional to the magnitude of the magnetizing current component.

26. The method according to claim 19 wherein the predetermined amount of phase displacement is 90 electrical degrees.

27. The method according to claim 19 wherein the step of algebraically summing the synchronous speed and the rotor slip speed is further defined as obtaining a signal proportional to the operating frequency of the stator current provided means to the stator winding and algebraically summing same with a signal proportional to the load current component magnitude.

28. A method for energizing the stator winding of a rotating AC induction motor from an AC power means at a frequency providing a synchronous speed equal to the speed of the rotor at the time of energization, said stator winding being electromagnetically coupled to the rotor; the stator winding having terminals connected to the AC power means, the AC power means energizing the stator winding with a stator current, the operating frequency and the current magnitude of the AC power means being variable, the synchronous speed of the motor corresponding to the operating frequency of the AC power means, the rotor speed differing from the synchronous speed by the slip of the rotor; said method comprising the steps of:
applying stator current energization of an arbitrarily selected magnitude and operating frequency to the stator winding from the AC power means;
determining the CEMF of the motor generated by the energization of the stator winding;
sensing the stator current;
determining whether the phase displacement between the CEMF and the stator current is less than or greater than a predetermined phase displacement amount, said predetermined phase displacement amount being the phase displacement existing between the CEMF and the stator current when the speed of the rotor is at synchronous speed; and
altering the operating frequency of the AC power means, in accordance with the foregoing determination, from the selected frequency to a frequency that causes the synchronous speed, corresponding to the operating frequency of the AC power means, to be equal to the rotor speed by decreasing the operating frequency of the AC power means when the phase displacement between the CEMF and the stator winding current is less than the predetermined phase displacement amount and increasing the operating frequency when the phase displacement is greater than the predetermined phase displacement amount.

29. The method according to claim 28 wherein the AC induction motor has a rated stator winding energization and wherein the method is further defined as applying the rated energization to the stator winding when the synchronous speed of the motor corresponds to the operating frequency of the AC power means.

30. The method according to claim 29 wherein a voltage exists at the terminals of the stator winding as a result of the energization of the stator winding and wherein the step of determining the CEMF is further defined as determining the stator impedance voltage drop of the motor and vectorially subtracting same from the terminal voltage at the stator winding.

31. A control for energizing an AC induction motor from an AC power means, the rotor of the motor rotating at the time the energization of the motor is commenced; the motor having a stator winding electromagnetically coupled to the rotor, the stator winding having input terminals by which the motor is coupled to the AC power means, the AC power means providing a stator current having an operating frequency to the stator winding of the motor, the magnitude of the current and its operating frequency being determined by current command and frequency command signals, respectively for the AC power means; there being a synchronous speed of the motor corresponding to an operating frequency of the stator current, the rotor speed differing from the synchronous speed by the slip of the rotor; said control comprising:
means for providing a signal corresponding to an arbitrarily selected speed of said motor;
means for providing a signal corresponding to the CEMF developed in the stator winding as a result of the flow of the magnetizing current component of the stator current through the stator winding, said CEMF signal comprising a frequency command signal for the AC power means for varying the operating frequency of the stator current in direct proportion to the magnitude of the CEMF signal, so that the magnetizing component of the stator current, and thus the magnetizing flux, may be maintained at a constant value at all operating frequencies;
regulating means having input means receiving said selected speed signal as a reference signal and said CEMF signal as a feedback signal, said regulating means having an output providing a signal for the AC power means that comprises the current command signal for establishing the magnitude of the stator current in the stator winding;
means for providing a signal proportional to the magnitude of the load current component of the stator current in the stator winding, said load current component signal being applied to said input means of said regulating means in a manner additive to said selected speed signal;
means for determining the phase displacement between the CEMF and the stator current;
means for determining whether the phase displacement between the CEMF and the stator current is less than, or greater than, a predetermined phase displacement amount, said predetermined phase displacement amount being the phase displacement existing between the CEMF and the stator current when the speed of the rotor is at the synchronous speed of the motor;
means for allowing the frequency command signal for the AC power means to be determined solely by the magnitude of the CEMF signal when the phase displacement between the CEMF and the stator current is less than the predetermined phase displacement amount and for increasing the frequency command signal for the AC power means when the phase displacement is greater than the predetermined phase displacement amount; and
means for limiting the magnitude of the current command signal for the AC power means, thereby to limit the magnitude of the total stator current while continuing to maintain the magnitude of the magnetizing current at a constant value, thereby also limiting the load current component of the stator current, and hence the slip of the motor.

32. The control according to claim 31 wherein said means for limiting the magnitude of the current command signal for the AC power means is further defined as means for limiting the output of said regulating means.

33. The control according to claim 31 wherein a voltage exists at the input terminals of the stator winding as a result of the provision of stator current thereto, and wherein said means for providing a signal corresponding to the CEMF is further defined as means for providing a signal proportional to the voltage existing at the input terminals of the stator winding, means for providing a signal representative of the stator impedance voltage drop, and means for vectorially subtracting the latter signal from the former signal to provide said signal corresponding to the CEMF.

34. The control according to claim 33 wherein the AC induction motor has a plurality of phase windings in the stator winding, wherein the AC power means is a polyphase means, and wherein said CEMF signal providing means includes a polyphase rectifier bridge connected to the output of said subtracting means.

35. The apparatus according to claim 31 wherein said means for providing a signal proportional to the magnitude of the load current component of the stator current in the stator winding comprises means for determining the magnitude of the load current component by the vector subtraction of the magnetizing current component of the stator current from the total stator current.

36. The apparatus according to claim 31 wherein said means for providing a signal proportional to the magnitude of the load current component of the stator current in the stator winding comprises means for generating a linear function approximating the relationship among the total stator current, the load current component, and the magnetizing current component in the motor and selected in accordance with the operating characteristics of the AC induction motor.

* * * * *